United States Patent
Inoue et al.

(10) Patent No.: US 11,908,354 B2
(45) Date of Patent: Feb. 20, 2024

(54) CONTROL DEVICE, PROJECTION APPARATUS, CONTROL METHOD, AND CONTROL PROGRAM

(71) Applicant: FUJIFILM Corporation, Tokyo (JP)

(72) Inventors: Kazuki Inoue, Saitama (JP); Akihiro Ishizuka, Saitama (JP); Tomonori Masuda, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/680,752

(22) Filed: Feb. 25, 2022

(65) Prior Publication Data

US 2022/0180780 A1  Jun. 9, 2022

Related U.S. Application Data

(63) Continuation of application No. PCT/JP2020/021645, filed on Jun. 1, 2020.

(30) Foreign Application Priority Data

Aug. 30, 2019 (JP) ................................ 2019-158888

(51) Int. Cl.
G09G 3/00 (2006.01)
(52) U.S. Cl.
CPC ..... *G09G 3/002* (2013.01); *G09G 2320/0666* (2013.01); *G09G 2340/04* (2013.01)
(58) Field of Classification Search
None
See application file for complete search history.

(56) References Cited

U.S. PATENT DOCUMENTS

| 6,536,907 | B1 | 3/2003 | Towner et al. |
| 2006/0238723 | A1* | 10/2006 | El-Ghoroury ........ H04N 9/3147 |
| | | | 348/E9.027 |
| 2007/0002081 | A1 | 1/2007 | Sakata |
| 2009/0273719 | A1 | 11/2009 | Kuwata et al. |

(Continued)

FOREIGN PATENT DOCUMENTS

| JP | 2006-349909 A | 12/2006 |
| JP | 2009-58583 A | 3/2009 |

(Continued)

OTHER PUBLICATIONS

International Preliminary Report on Patentability for International Application No. PCT/JP2020/021645, dated Mar. 8, 2021, with an English translation.

(Continued)

*Primary Examiner* — Matthew Yeung
(74) *Attorney, Agent, or Firm* — Birch, Stewart, Kolasch & Birch, LLP

(57) ABSTRACT

A system control portion generates corrected image data by performing reduction processing of reducing input image data input into a display portion at a first reduction rate and image shifting processing of shifting positions of R image data and B image data of a specific color component included in reduced image data obtained by the reduction processing. The system control portion projects a corrected image based on the corrected image data to a screen by inputting the corrected image data into the display portion.

5 Claims, 11 Drawing Sheets

(56) References Cited

U.S. PATENT DOCUMENTS

| | | | |
|---|---|---|---|
| 2015/0219983 A1* | 8/2015 | Mashitani | H04N 9/3188 |
| | | | 353/121 |
| 2017/0244941 A1 | 8/2017 | Yagi | |
| 2017/0289507 A1 | 10/2017 | Iguchi | |
| 2018/0061262 A1 | 3/2018 | Nakashin | |

FOREIGN PATENT DOCUMENTS

| | | |
|---|---|---|
| JP | 2013-48365 A | 3/2013 |
| JP | 2016-157005 A | 9/2016 |
| JP | 2017-147634 A | 8/2017 |
| JP | 2017-181712 A | 10/2017 |
| JP | 2017-200021 A | 11/2017 |
| JP | 2018-36540 A | 3/2018 |

OTHER PUBLICATIONS

International Search Report for International Application No. PCT/JP2020/021645, dated Aug. 11, 2020, with an English translation.

\* cited by examiner

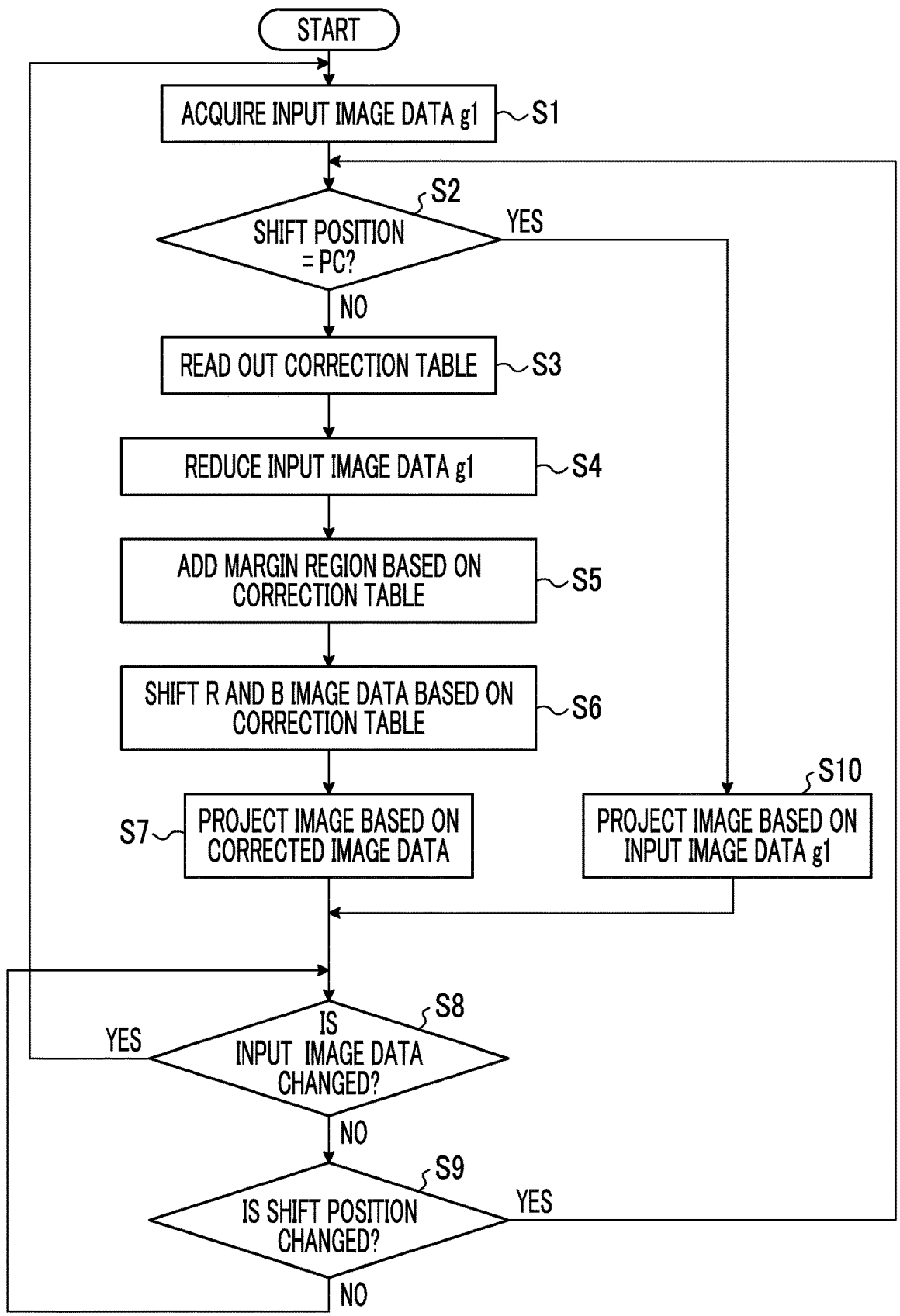

CONTROL DEVICE, PROJECTION APPARATUS, CONTROL METHOD, AND CONTROL PROGRAM

CROSS REFERENCE TO RELATED APPLICATION

This is a continuation of International Application No. PCT/JP2020/021645 filed on Jun. 1, 2020, and claims priority from Japanese Patent Application No. 2019-158888 filed on Aug. 30, 2019, the entire disclosures of which are incorporated herein by reference.

BACKGROUND OF THE INVENTION

1. Field of the Invention

The present invention relates to a control device, a projection apparatus, a control method, and a computer readable medium storing a control program.

2. Description of the Related Art

JP2009-58583A discloses correction of a lateral chromatic aberration of a projection optical system by image processing.

SUMMARY OF THE INVENTION

One embodiment according to the disclosed technology provides a control device, a projection apparatus, a control method, and a computer readable medium storing a control program that can suppress a lateral chromatic aberration without a loss in projected image.

A control device according to an aspect of the present invention is a control device of a projection apparatus that projects an image from a display portion displaying the image based on input image data to a projection object through an optical system, and comprises a correction portion that generates corrected image data by performing correction processing including reduction processing of reducing input image data input into the display portion at a first reduction rate and image shifting processing of shifting a position of color image data of a specific color component included in reduced image data obtained by the reduction processing, and a projection control portion that projects a corrected image based on the corrected image data to the projection object by inputting the corrected image data generated by the correction portion into the display portion.

A projection apparatus according to an aspect of the present invention comprises the control device and the optical system.

A control method according to an aspect of the present invention is a control method of a projection apparatus that projects an image from a display portion displaying the image based on input image data to a projection object through an optical system, and comprises a correction step of generating corrected image data by performing correction processing including reduction processing of reducing input image data input into the display portion at a first reduction rate and image shifting processing of shifting a position of color image data of a specific color component included in reduced image data obtained by the reduction processing, and a projection control step of projecting a corrected image based on the corrected image data to the projection object by inputting the corrected image data generated in the correction step into the display portion.

A control program according to an aspect of the present invention is a control program of a projection apparatus that projects an image from a display portion displaying the image based on input image data to a projection object through an optical system, and causes a computer to execute a correction step of generating corrected image data by performing correction processing including reduction processing of reducing input image data input into the display portion at a first reduction rate and image shifting processing of shifting a position of color image data of a specific color component included in reduced image data obtained by the reduction processing, and a projection control step of projecting a corrected image based on the corrected image data to the projection object by inputting the corrected image data generated in the correction step into the display portion.

According to the present invention, a control device, a projection apparatus, a control method, and a computer readable medium storing a control program that can suppress a lateral chromatic aberration without a loss in projected image can be provided.

BRIEF DESCRIPTION OF THE DRAWINGS

FIG. 11 is a flowchart for describing an operation of the system control portion 14.

DESCRIPTION OF THE PREFERRED EMBODIMENTS

Hereinafter, an embodiment of the present invention will be described with reference to the drawings.

Figure 1:
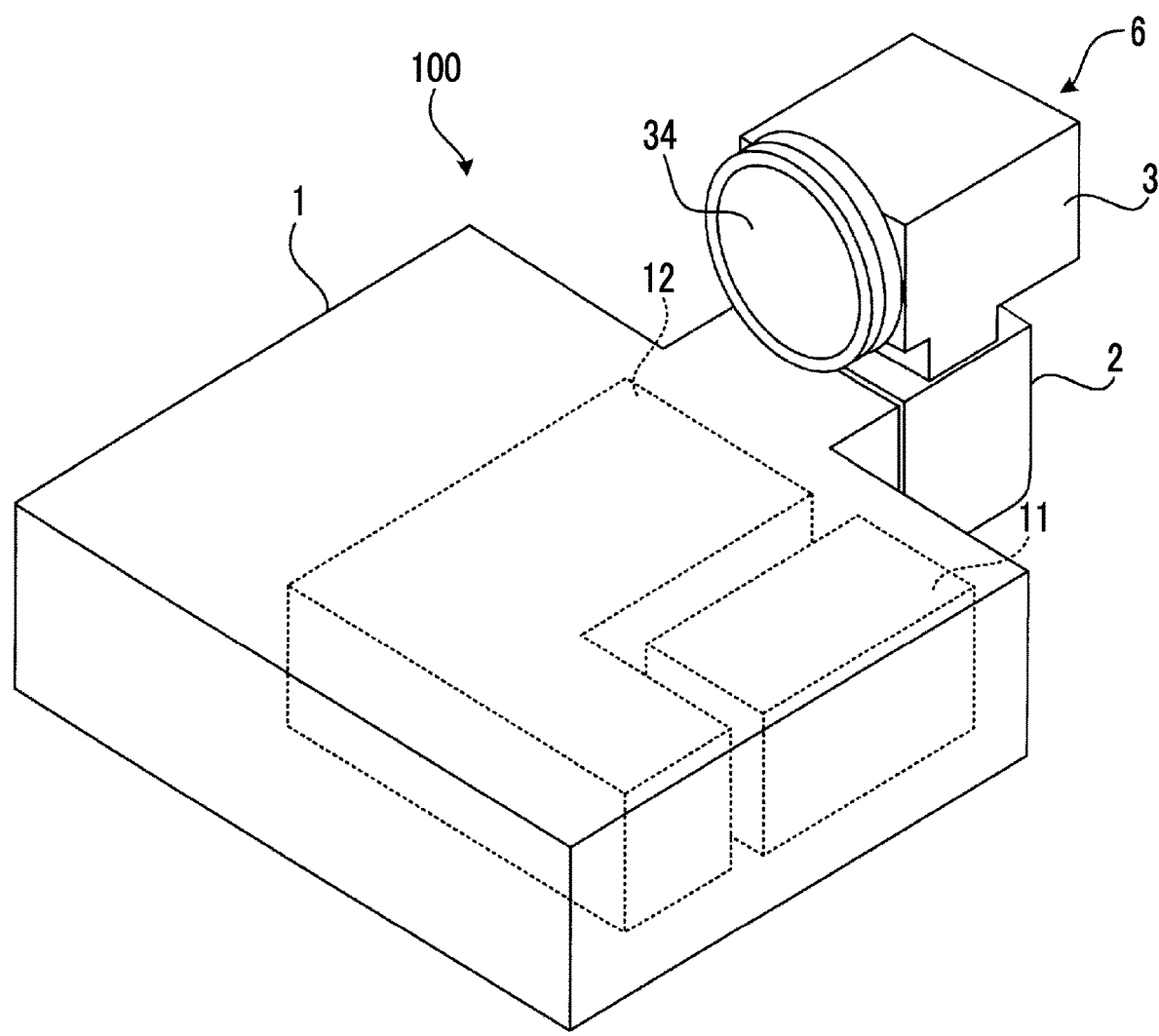
FIG. 1 is a schematic diagram illustrating an exterior configuration of a projector 100 that is an embodiment of a projection apparatus according to the embodiment of the present invention.
Figure 2:
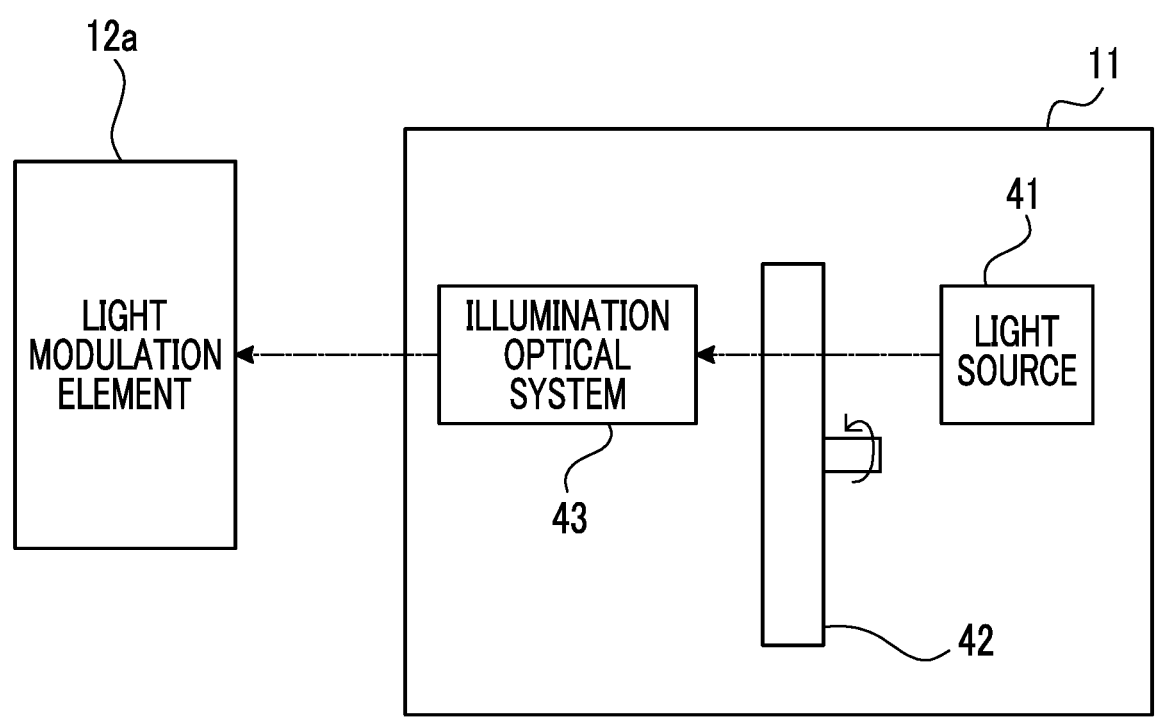
FIG. 2 is a schematic diagram illustrating an example of an internal configuration of a light source unit 11 in FIG. 1.
Figure 3:
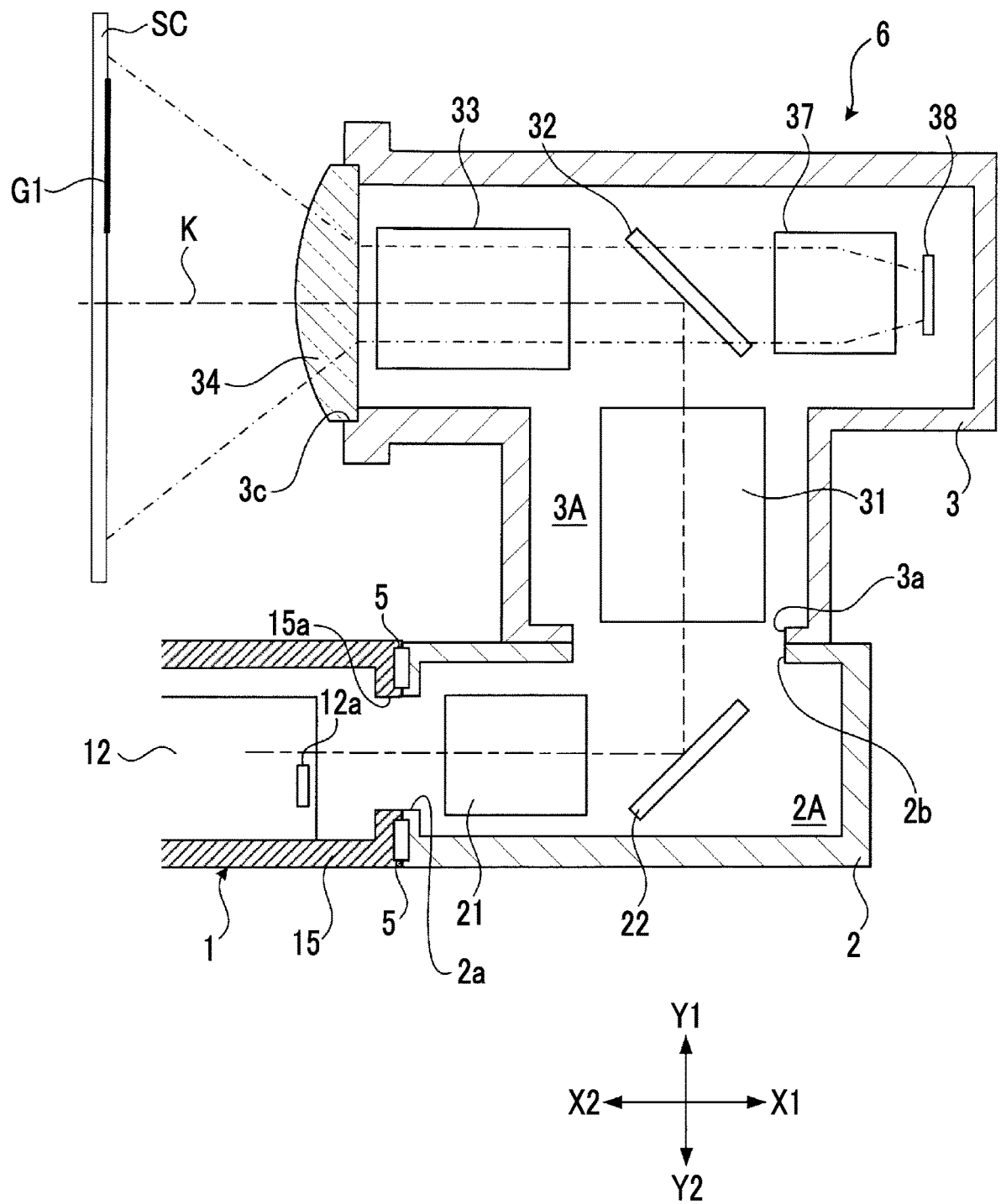
FIG. 3 is a schematic cross-sectional view of an optical unit 6 of the projector 100 illustrated in FIG. 1.

FIG. 1 is a schematic diagram illustrating an exterior configuration of a projector 100 that is an embodiment of a projection apparatus according to the embodiment of the present invention. FIG. 2 is a schematic diagram illustrating an example of an internal configuration of a light source unit 11 in FIG. 1. FIG. 3 is a schematic cross-sectional view of an optical unit 6 of the projector 100 illustrated in FIG. 1.

FIG. 3 illustrates a cross section in a plane along an optical path of light emitted from a body part 1.

As illustrated in FIG. 1, the projector 100 comprises the body part 1 and the optical unit 6 disposed to protrude from the body part 1. The optical unit 6 comprises a first member 2 supported by the body part 1 and a second member 3 supported by the first member 2.

The second member 3 may be fixed to the first member 2 in a rotatable state. In addition, the first member 2 and the second member 3 may be integrated members. The optical unit 6 may be attachably and detachably configured (in other words, interchangeably configured) with respect to the body part 1.

The body part 1 includes a housing 15 (refer to FIG. 3) in which an opening 15a (refer to FIG. 3) for causing light to pass to a part connected to the optical unit 6 is formed.

As illustrated in FIG. 1, the light source unit 11 and a light modulation unit 12 including a light modulation element 12a (refer to FIG. 2) that generates an image by spatially modulating light emitted from the light source unit 11 based on input image data are disposed inside the housing 15 of the body part 1. A display portion is configured with the light source unit 11 and the light modulation unit 12.

In the example illustrated in FIG. 2, the light source unit 11 comprises a light source 41 emitting white light, a color wheel 42, and an illumination optical system 43. The light source 41 is configured to include a light emitting element such as a laser or a light emitting diode (LED). The color wheel 42 is arranged between the light source 41 and the illumination optical system 43. The color wheel 42 is a member having a circular plate shape. An R filter that allows transmission of red light, a G filter that allows transmission of green light, and a B filter that allows transmission of blue light are disposed in a circumferential direction of the color wheel 42. The color wheel 42 is rotated about a shaft and guides the white light emitted from the light source 41 to the illumination optical system 43 by separating the white light into red light, green light, and blue light in a time-division manner. Light emitted from the illumination optical system 43 is incident on the light modulation element 12a.

In a case of the configuration of the light source unit 11 in FIG. 2, for example, a digital micromirror device (DMD) is used as the light modulation element 12a included in the light modulation unit 12. A liquid crystal on silicon (LCOS), a micro electro mechanical systems (MEMS) element, a liquid crystal display device, or the like can also be used as the light modulation element 12a. As illustrated in FIG. 3, the image (image displayed on the display portion) formed by the light spatially modulated by the light modulation unit 12 is incident on the optical unit 6 by passing through the opening 15a of the housing 15 and is projected to a screen SC as a projection object. Accordingly, an image G1 can be visible from an observer.

The light modulation element 12a is configured to include a display surface on which a display pixel for forming one pixel of the image G1 is two-dimensionally arranged.

As illustrated in FIG. 3, the optical unit 6 comprises the first member 2 including a hollow portion 2A connected to the inside of the body part 1, the second member 3 including a hollow portion 3A connected to the hollow portion 2A, a first optical system 21 and a reflective member 22 arranged in the hollow portion 2A, and a second optical system 31, a branch member 32, a third optical system 33, a fourth optical system 37, an imaging element 38, and a lens 34 arranged in the hollow portion 3A, and a shift mechanism 5.

The first member 2 is a member of which a cross-sectional exterior shape is, for example, a rectangular shape. An opening 2a and an opening 2b are formed in surfaces perpendicular to each other. The first member 2 is supported by the body part 1 in a state where the opening 2a is arranged at a position facing the opening 15a of the body part 1. Light emitted from the light modulation element 12a of the light modulation unit 12 of the body part 1 is incident into the hollow portion 2A of the first member 2 by passing through the opening 15a and the opening 2a.

An incidence direction of the light incident into the hollow portion 2A from the body part 1 will be referred to as a direction X1. A direction opposite to the direction X1 will be referred to as a direction X2. The direction X1 and the direction X2 will be collectively referred to as a direction X. In addition, a depth direction from the front of FIG. 3 and a direction opposite to the depth direction will be referred to as a direction Z. In the direction Z, the depth direction from the front of FIG. 3 will be referred to as a direction Z1, and a forward direction from the back of FIG. 3 will be referred to as a direction Z2.

In addition, a direction perpendicular to the direction X and the direction Z will be referred to as a direction Y. In the direction Y, an upward direction in FIG. 3 will be referred to as a direction Y1, and a downward direction in FIG. 3 will be referred to as a direction Y2. In the example in FIG. 3, the projector 100 is arranged such that the direction Y2 is a vertical direction.

The first optical system 21, the reflective member 22, the second optical system 31, the branch member 32, the third optical system 33, and the lens 34 constitute an optical system (hereinafter, referred to as a projection optical system) for projecting the image formed by the light modulation element 12a to the screen SC. An optical axis K of the projection optical system is illustrated in FIG. 3.

The first optical system 21, the reflective member 22, the second optical system 31, the branch member 32, the third optical system 33, and the lens 34 are arranged in this order from the light modulation element 12a side along the optical axis K. In the example in FIG. 3, the light modulation element 12a is arranged to be shifted to the direction Y2 side of the optical axis K. In other words, a center of the image (center of the display surface) formed by the light modulation element 12a does not match the optical axis K and is positioned on the direction Y2 side of the optical axis K.

The first optical system 21 includes at least one lens and guides, to the reflective member 22, light that is incident on the first member 2 from the body part 1 and travels in the direction X1.

The reflective member 22 reflects the light incident from the first optical system 21 in the direction Y1. The reflective member 22 is configured with, for example, a mirror. In the first member 2, the opening 2b is formed on an optical path of the light reflected by the reflective member 22. The reflected light travels to the hollow portion 3A of the second member 3 by passing through the opening 2b.

The second member 3 is a member of which a cross-sectional exterior shape is an approximately T shape. An opening 3a is formed at a position facing the opening 2b of the first member 2. The light that has passed through the opening 2b of the first member 2 from the body part 1 is incident into the hollow portion 3A of the second member 3 by passing through the opening 3a. The first member 2 and the second member 3 may have any cross-sectional exterior shapes and are not limited to the above cross-sectional exterior shapes.

The second optical system 31 includes at least one lens and guides light incident from the first member 2 to the branch member 32.

The branch member 32 guides the light incident from the second optical system 31 to the third optical system 33 by reflecting the light in the direction X2. In addition, the branch member 32 guides subject light that is incident on the lens 34 from the screen SC side and travels in the direction X1 by passing through the third optical system 33, to the fourth optical system 37 by allowing transmission of the subject light. The branch member 32 is configured with, for example, a half mirror or a polarizing plate.

The third optical system 33 includes at least one lens and guides the light reflected by the branch member 32 to the lens 34.

The lens 34 is arranged in an end part of the second member 3 on the direction X2 side and covers an opening 3c formed in the end part. The lens 34 projects the light incident from the third optical system 33 to the screen SC.

The fourth optical system 37 includes at least one lens and is arranged adjacent to the branch member 32 on the direction X1 side and guides, to the imaging element 38, the subject light that is transmitted through the branch member 32 and travels in the direction X1. An optical axis of the fourth optical system 37 approximately matches optical axes of the lens 34 and the third optical system 33. The fourth optical system 37 may include a lens having a variable focal length.

The imaging element 38 is a charge coupled device (CCD) image sensor, a complementary metal oxide semiconductor (CMOS) image sensor, or the like.

The imaging element 38 images the screen SC through the lens 34, the third optical system 33, the branch member 32, and the fourth optical system 37. The lens 34, the third optical system 33, and the branch member 32 constitute a part of the projection optical system.

The shift mechanism 5 is a mechanism for moving the optical axis K of the projection optical system (in other words, the optical unit 6) in a direction (direction Y in FIG. 3) perpendicular to the optical axis K. Specifically, the shift mechanism 5 is configured to be capable of changing a position of the first member 2 in the direction Y with respect to the body part 1. The shift mechanism 5 may manually move the first member 2 or electrically move the first member 2.

FIG. 3 illustrates a state where the first member 2 is moved to the maximum to the direction Y1 side by the shift mechanism 5. By moving the first member 2 in the direction Y2 from the state illustrated in FIG. 3 using the shift mechanism 5, a relative position between the center of the image (in other words, the center of the display surface) formed by the light modulation element 12a and the optical axis K changes, and the image G1 projected to the screen SC can be shifted (translated) in the direction Y2.

The shift mechanism 5 may be a mechanism that moves the light modulation element 12a in the direction Y instead of moving the optical unit 6 in the direction Y. Even in this case, the image G1 projected to the screen SC can be shifted in the direction Y2.

Figure 4:
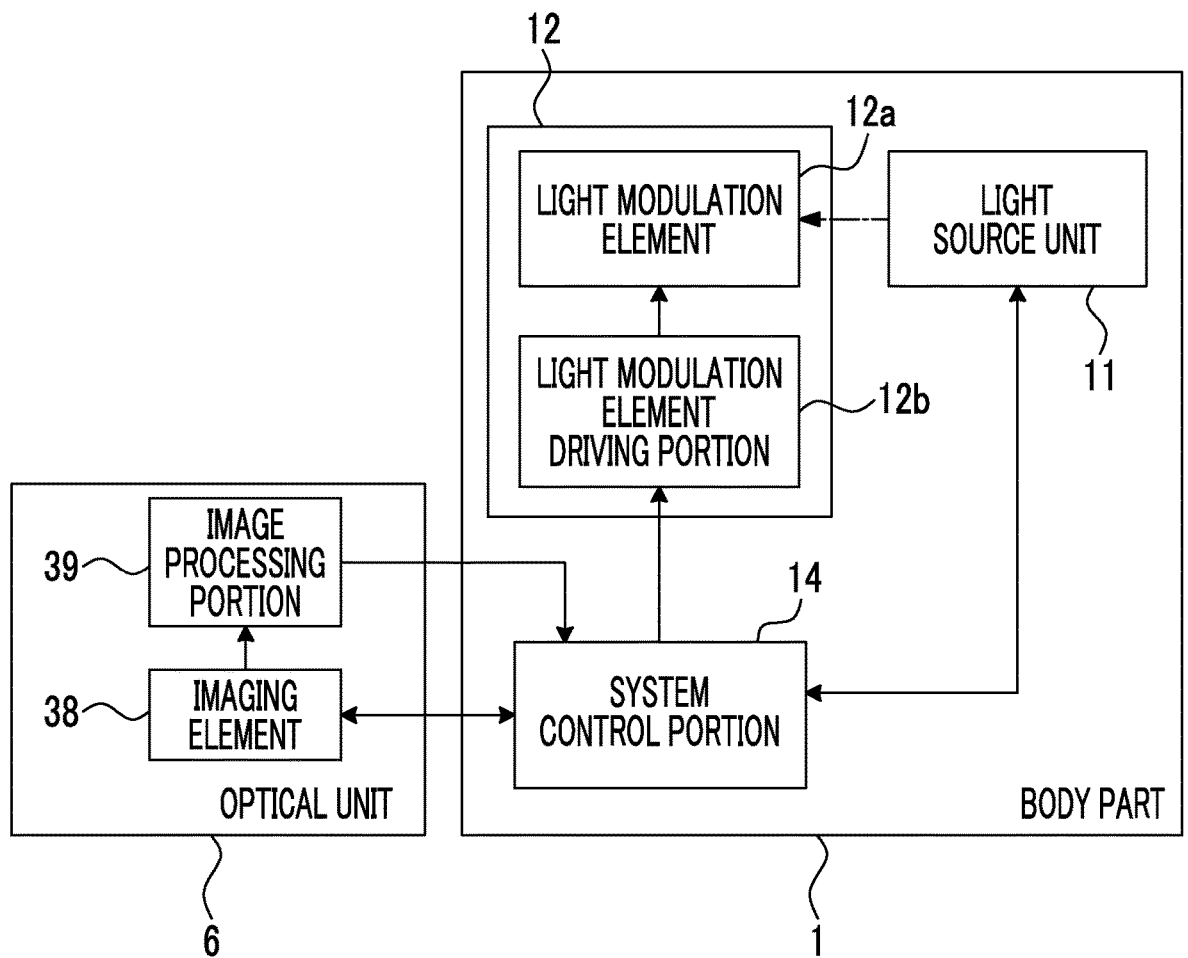
FIG. 4 is a schematic diagram illustrating an internal block configuration of the projector 100 illustrated in FIG. 1.

FIG. 4 is a schematic diagram illustrating an internal block configuration of the projector 100 illustrated in FIG. 1. The light source unit 11, the light modulation unit 12 including the light modulation element 12a and a light modulation element driving portion 12b driving the light modulation element 12a, and a system control portion 14 controlling the entire projector 100 are disposed in the body part 1 of the projector 100.

The imaging element 38 and an image processing portion 39 that generates captured image data by processing a captured image signal input from the imaging element 38 are disposed in the optical unit 6. The captured image data generated by the image processing portion 39 is input into the system control portion 14. An imaging portion is configured with the imaging element 38 and the image processing portion 39.

The light modulation element driving portion 12b drives the light modulation element 12a based on the input image data input from the system control portion 14 and spatially modulates the light from the light source unit 11 using the input image data. The input image data is not limited to image data input from an external apparatus such as a personal computer, a smartphone, or a tablet terminal and may be input image data generated inside the projector 100. In addition, a data format of the input image data may be any of digital data and analog data after digital to analog conversion.

The system control portion 14 comprises various processors, a read only memory (ROM), and a random access memory (RAM).

The various processors include a central processing unit (CPU) that is a general-purpose processor performing various types of processing by executing a program, a programmable logic device (PLD) such as a field programmable gate array (FPGA) that is a processor having a circuit configuration changeable after manufacturing, a dedicated electric circuit such as an application specific integrated circuit (ASIC) that is a processor having a circuit configuration dedicatedly designed to execute a specific type of processing, or the like. A structure of these various processors is more specifically an electric circuit in which circuit elements such as semiconductor elements are combined.

The processors of the system control portion 14 may be configured with one of the various processors or may be configured with a combination of two or more processors of the same type or different types (for example, a combination of a plurality of FPGAs or a combination of a CPU and an FPGA). The processors of the system control portion 14 function as a control device comprising a correction portion by executing a control program.

Figure 5:
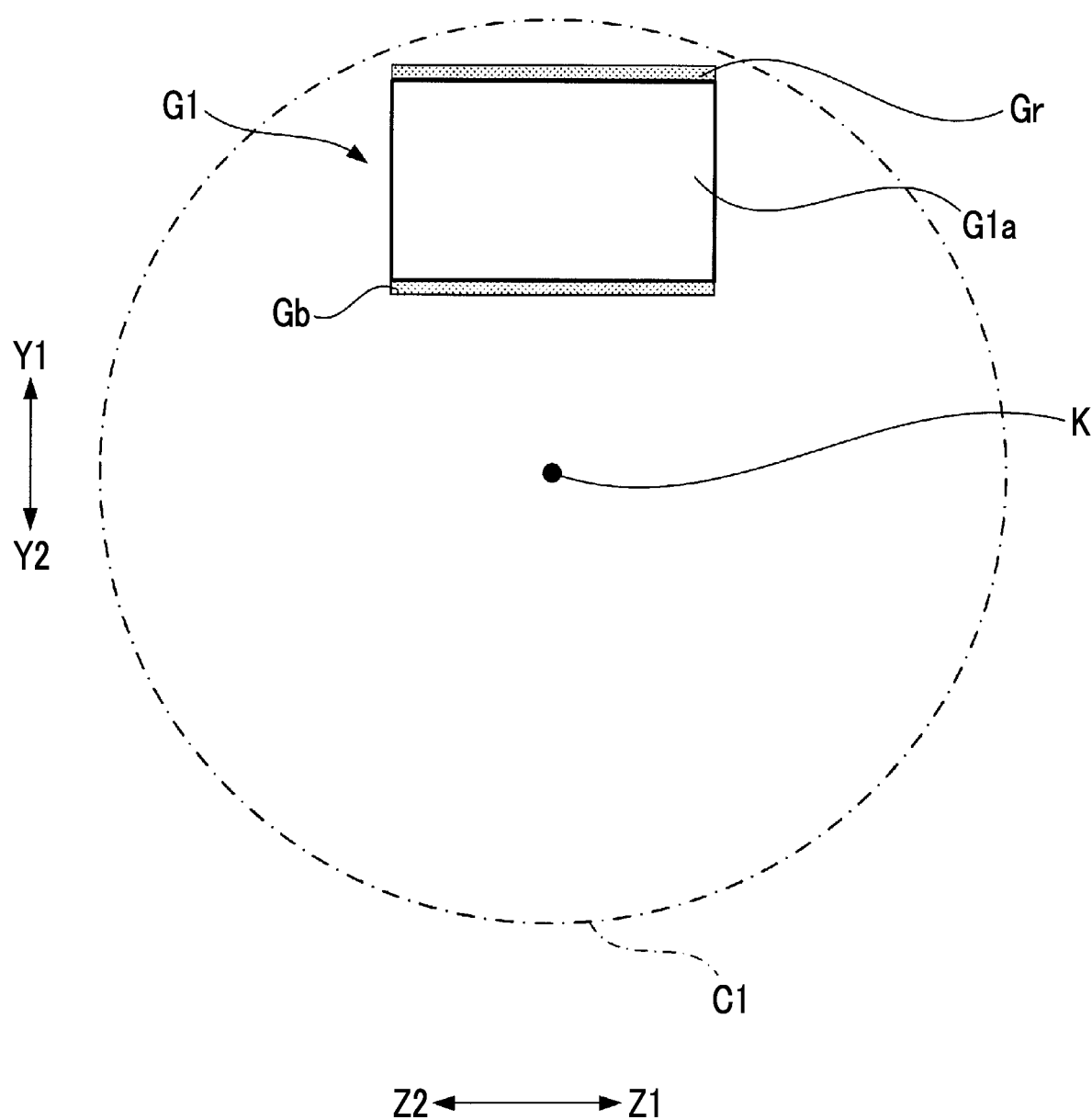
FIG. 5 is a schematic diagram in which an image G1 projected to a screen SC is viewed in a direction X2.

FIG. 5 is a schematic diagram in which the image G1 projected to the screen SC is viewed in the direction X2. FIG. 5 illustrates a state (state where a shift position of the first member 2 is a shift position PU) where the first member 2 is moved to the maximum to the direction Y1 side by the shift mechanism 5.

In FIG. 5, an image circle Cl (circle centered at the optical axis K) that indicates a light-receiving range, in the screen SC, of light emittable from the projection optical system is illustrated.

As illustrated in FIG. 5, in a state where the shift position of the first member 2 is the shift position PU, a chromatic aberration occurs in the image G1 projected to the screen SC. In the following description, a pixel value of each pixel of the input image data that is a base of the image G1 is configured with a pixel value of red (R), a pixel value of green (G), and a pixel value of blue (B).

In addition, in the input image data, a collection of pixel values of R of each pixel will be referred to as R image data. A collection of pixel values of G of each pixel will be referred to as G image data. A collection of pixel values of B of each pixel will be referred to as B image data. In other words, the input image data is configured with the R image data, the G image data, and the B image data. Each of the R image data, the G image data, and the B image data constitute color image data.

In the state illustrated in FIG. 5, an optical characteristic of the projection optical system causes a G image based on the G image data of the input image data to be projected to a predetermined position, causes an R image based on the R image data of the input image data to be projected with a deviation in the direction Y1 from the predetermined position, and causes a B image based on the B image data of the input image data to be projected with a deviation in the direction Y2 from the predetermined position.

Consequently, the image G1 includes an image region G1a projected to the predetermined position, an R image region Gr in which a part of the R image is projected to protrude to the direction Y1 side from an end of the image region G1a on the direction Y1 side, and a B image region Gb in which a part of the B image is projected to protrude to the direction Y2 side from an end of the image region G1a on the direction Y2 side.

Figure 6:
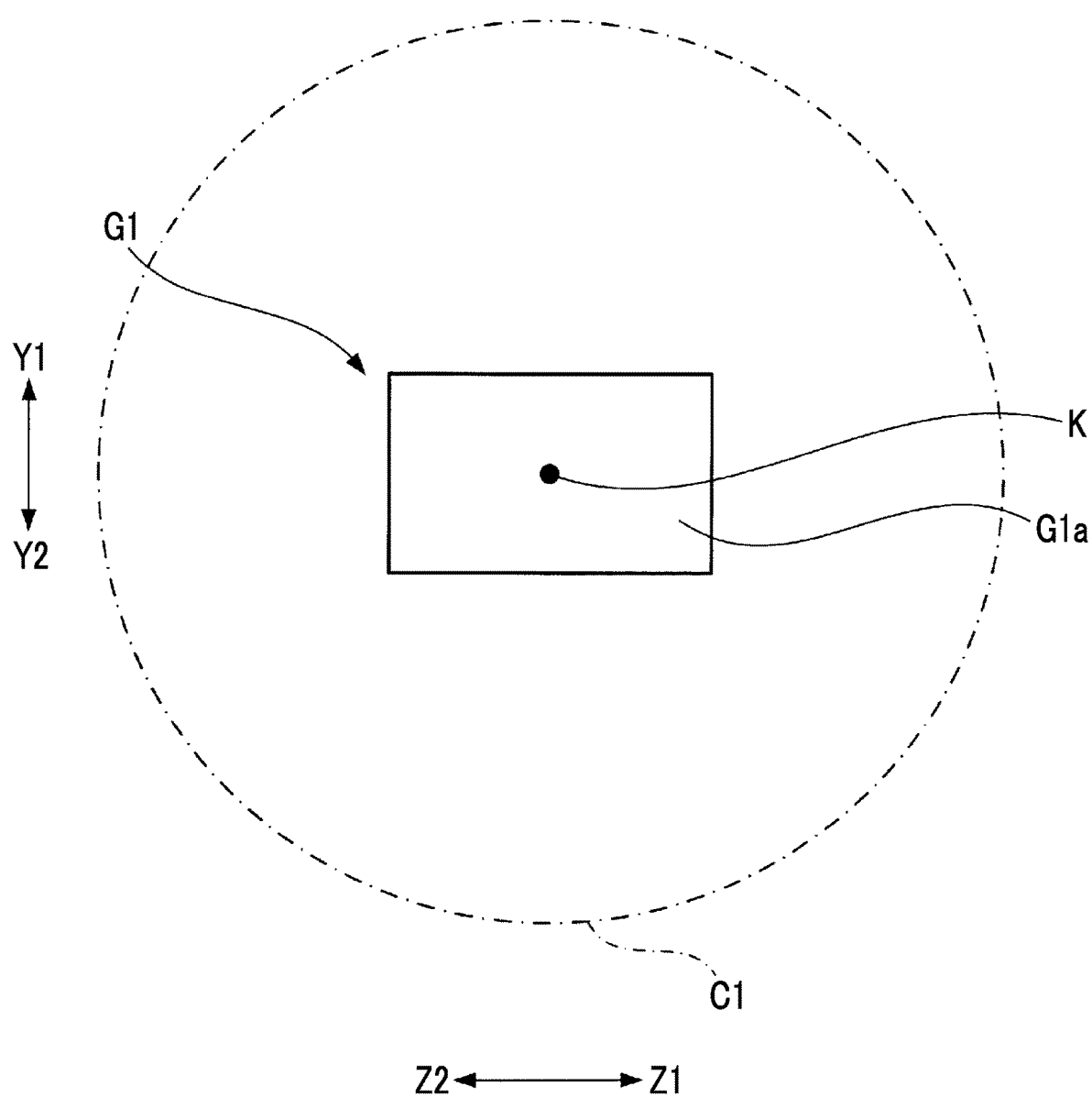
FIG. 6 is a diagram illustrating a state where a first member 2 is moved to a direction Y2 side from a state illustrated in FIG. 5 by a shift mechanism 5.

FIG. 6 is a diagram illustrating a state where the first member 2 is moved to the direction Y2 side from the state illustrated in FIG. 5 by the shift mechanism 5. FIG. 6 illustrates a state (state where the shift position of the first member 2 is a shift position PC) where a center of the image G1 and the optical axis K match. In the state illustrated in FIG. 6, the chromatic aberration does not occur in the image G1. Thus, the image G1 is configured with only the image region G1a projected to the predetermined position, and the R image region Gr and the B image region Gb do not occur.

Figure 7:
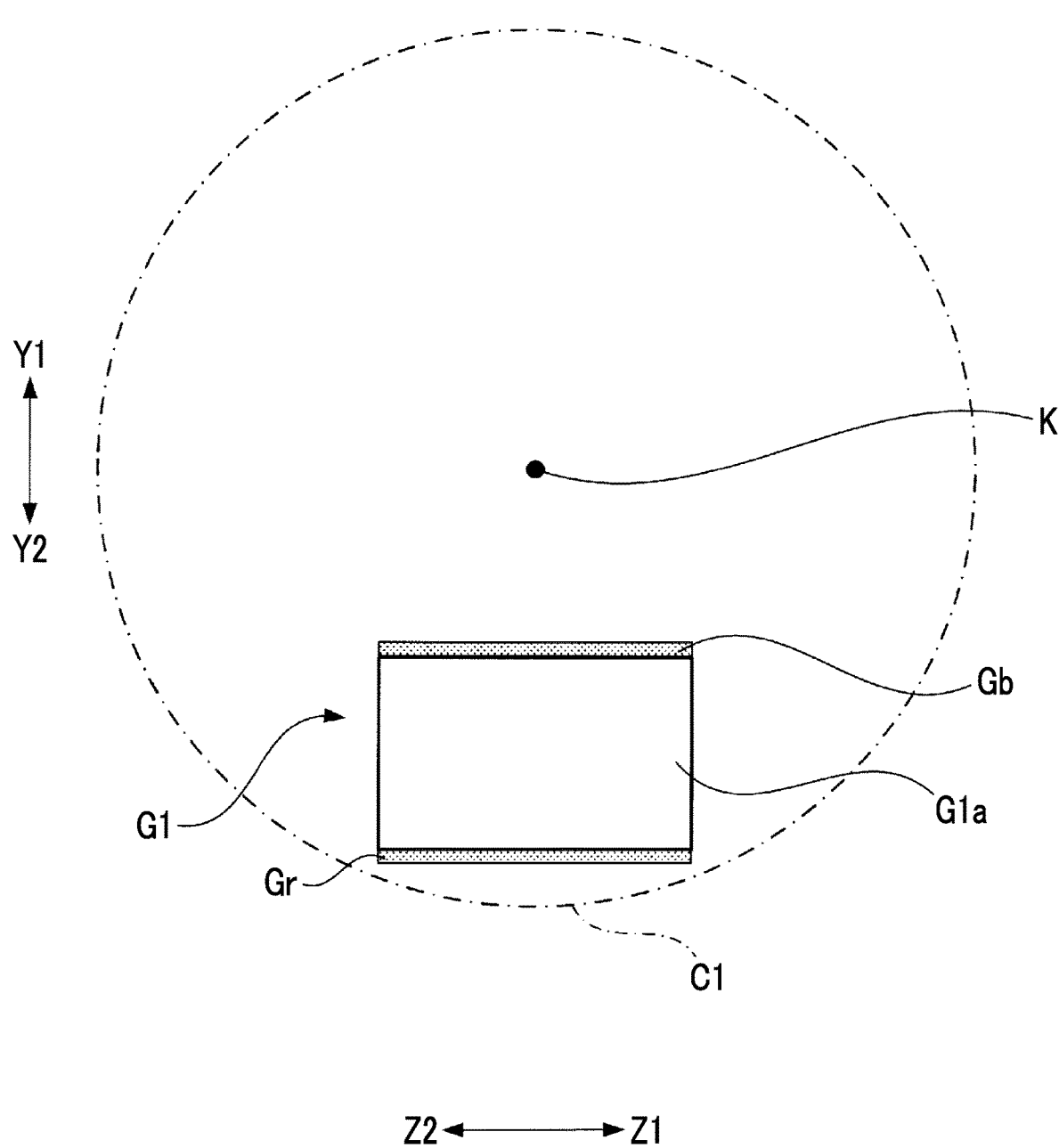
FIG. 7 is a diagram illustrating a state where the first member 2 is moved to the direction Y2 side from a state illustrated in FIG. 6 by the shift mechanism 5.

FIG. 7 is a diagram illustrating a state where the first member 2 is moved to the direction Y2 side from the state illustrated in FIG. 6 by the shift mechanism 5. FIG. 7 illustrates a state (state where the shift position of the first member 2 is a shift position PD) where the first member 2 is moved to the maximum to the direction Y2 side by the shift mechanism 5.

In the state illustrated in FIG. 7, the optical characteristic of the projection optical system causes the G image based on the G image data of the input image data to be projected to the predetermined position, causes the R image based on the R image data of the input image data to be projected with a deviation in the direction Y2 from the predetermined position, and causes the B image based on the B image data of the input image data to be projected with a deviation in the direction Y1 from the predetermined position.

Consequently, the image G1 includes the image region G1a projected to the predetermined position, the R image region Gr in which a part of the R image is projected to protrude to the direction Y2 side from the end of the image region G1a on the direction Y2 side, and the B image region Gb in which a part of the B image is projected to protrude to the direction Y1 side from the end of the image region G1a on the direction Y1 side.

Adding a shift mechanism for moving the first member 2 in the direction Z with respect to the body part 1 also enables the projector 100 to shift the image G1 in the direction Z.

For example, a configuration of shifting the image G1 in a right-left direction from the state illustrated in FIG. 6 is considered. In this configuration, for example, in a state where the image G1 is shifted to the maximum in the direction Z1 from the state in FIG. 6, the R image region Gr occurs at a right end of the image region G1a projected to the predetermined position, and the B image region Gb occurs at a left end of the image region G1a. In addition, in a state where the image G1 is shifted to the maximum in the direction Z2 from the state in FIG. 6, the R image region Gr occurs at the left end of the image region G1a projected to the predetermined position, and the B image region Gb occurs at the right end of the image region G1a.

In addition, for example, a configuration of shifting the image G1 in an inclined upper-right direction and an inclined lower-left direction from the state illustrated in FIG. 6 by driving the two shift mechanisms is considered.

In this configuration, for example, in a state where the image G1 is shifted to the maximum in the inclined upper-right direction from the state in FIG. 6, the R image region Gr occurs at an upper end and the right end of the image region G1a projected to the predetermined position, and the B image region Gb occurs at a lower end and the left end of the image region G1a.

In addition, in a state where the image G1 is shifted to the maximum in the inclined lower-left direction from the state in FIG. 6, the R image region Gr occurs at the lower end and the left end of the image region G1a projected to the predetermined position, and the B image region Gb occurs at the upper end and the right end of the image region G1a.

Accordingly, deviation directions of the R image and the B image in the image G1 may change depending on the shift position of the first member 2. In addition, a width of each of the R image region Gr and the B image region Gb in the direction Y in the image G1 may change depending on the shift position of the first member 2.

Furthermore, the width of each of the R image region Gr and the B image region Gb in the direction Y in the image G1 may change depending on a projection condition. The projection condition is any one of a focal length of the projection optical system, a focal position of the projection optical system, and a distance between the projection optical system and the screen SC, or a combination of a selected plurality thereof.

Here, while an example in which projection positions of the R image and the B image deviate is illustrated, a color of an image of which a projection position deviates due to the chromatic aberration is decided by the optical characteristic of the projection optical system or a value (image height) representing an image position as a distance from the optical axis K on an evaluation surface of the projection optical system, and is not limited to this example. In addition, the color of the image of which the projection position deviates due to the chromatic aberration may be a single color instead of a plurality of colors.

The system control portion 14 generates corrected image data by performing correction processing on the input image data such that the R image region Gr and the B image region Gb illustrated in FIG. 5 and FIG. 7 do not occur in the image G1, and projects a corrected image based on the corrected image data to the screen SC by inputting the corrected image data into the light modulation unit 12.

The system control portion 14 functions as a control device comprising a correction portion that performs the correction processing, and a projection control portion that projects the corrected image, by executing the control program.

Figure 8:
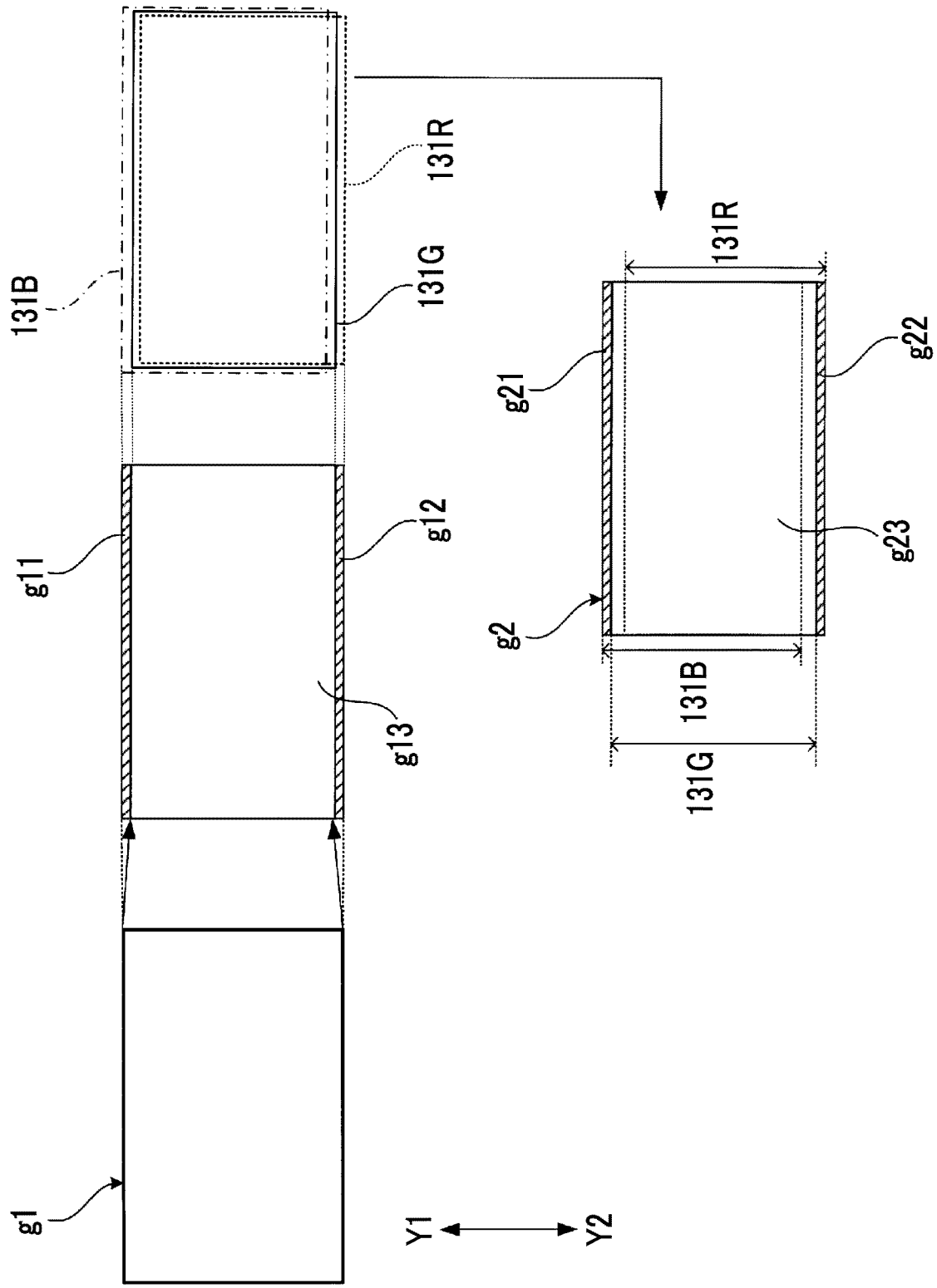
FIG. 8 is a schematic diagram for describing correction processing of input image data performed by a system control portion 14.

FIG. 8 is a schematic diagram for describing the correction processing of the input image data performed by the system control portion 14. FIG. 8 is used for describing the correction processing that causes the R image region Gr and the B image region Gb not to occur at the shift position illustrated in FIG. 5. In the following description, it is assumed that a size of the input image data is the same as a size of the display surface of the light modulation element 12a.

First, the system control portion 14 generates reduced image data g13 by performing reduction processing of reducing input image data g1 illustrated in FIG. 8. In the reduction processing, reduction is performed in only the direction Y.

As described above, the widths of the R image region Gr and the B image region Gb included in the image G1 in the direction Y, a deviation direction of the R image region Gr from the image region G1a, and a deviation direction of the B image region Gb from the image region G1a are decided by a combination of the shift position and the projection condition.

Hereinafter, a value obtained by converting the decided width of the R image region Gr into the number of pixels of the input image data g1 will be referred to as an R deviation amount Rp. The deviation direction (in the example in FIG. 5, the direction Y1; in the example in FIG. 7, the direction Y2) of the R image region Gr will be referred to as an R deviation direction Rd. A value obtained by converting the width of the B image region Gb into the number of pixels of the input image data g1 will be referred to as a B deviation amount Bp. The deviation direction (in the example in FIG. 5, the direction Y2; in the example in FIG. 7, the direction Y1) of the B image region Gb will be referred to as a B deviation direction Bd.

In a case where the total number of pixels of the input image data g1 in the direction Y is denoted by n, and a sum of the R deviation amount Rp and the B deviation amount Bp is denoted by m, a reduction rate SH in the direction Y can be obtained in units of % by (Expression 1) below.

$$SH=\{(n-m)/n\}\times 100 \quad \text{(Expression 1)}$$

Accordingly, the system control portion 14 reduces the input image data g1 in the direction Y using the reduction rate SH decided in accordance with the combination of the shift position and the projection condition.

Furthermore, the system control portion 14 adds a first margin region g11 having a width in the direction Y corresponding to the B deviation amount Bp decided in accordance with the combination, next to the reduced image data g13 in the R deviation direction Rd decided in accordance with the combination.

In addition, the system control portion 14 adds a second margin region g12 having a width in the direction Y corresponding to the R deviation amount Rp decided in accordance with the combination, next to the reduced image data g13 in the B deviation direction Bd decided in accordance with the combination.

Each of the first margin region g11 and the second margin region g12 is a region in which a pixel value of each color of all pixels is zero. A size of data in which the first margin region g11, the second margin region g12, and the reduced image data g13 are combined matches the size of the input image data g1 but may be less than the size of the input image data g1.

The system control portion 14 performs image shifting processing of shifting B image data 131B (collection of pixel values of B of each pixel of the reduced image data g13) of the reduced image data g13 included in the data in which the first margin region g11, the second margin region g12, and the reduced image data g13 are combined, in a direction (here, the direction Y1 since the state in FIG. 5 is illustrated) opposite to the B deviation direction Bd by the B deviation amount Bp and shifting R image data 131R (collection of pixel values of R of each pixel of the reduced image data g13) in a direction (here, the direction Y2 since the state in FIG. 5 is illustrated) opposite to the R deviation direction Rd by the R deviation amount Rp.

Performing the reduction processing and the image shifting processing generates corrected image data g2 after the correction processing of the input image data g1. As illustrated in FIG. 8, the corrected image data g2 is data consisting of a region g21, a region g22, and a region g23. The region g21 is a region in which a part of the B image data 131B is included in the first margin region g11. The region g22 is a region in which a part of the R image data 131R is included in the second margin region g12.

Figure 9:
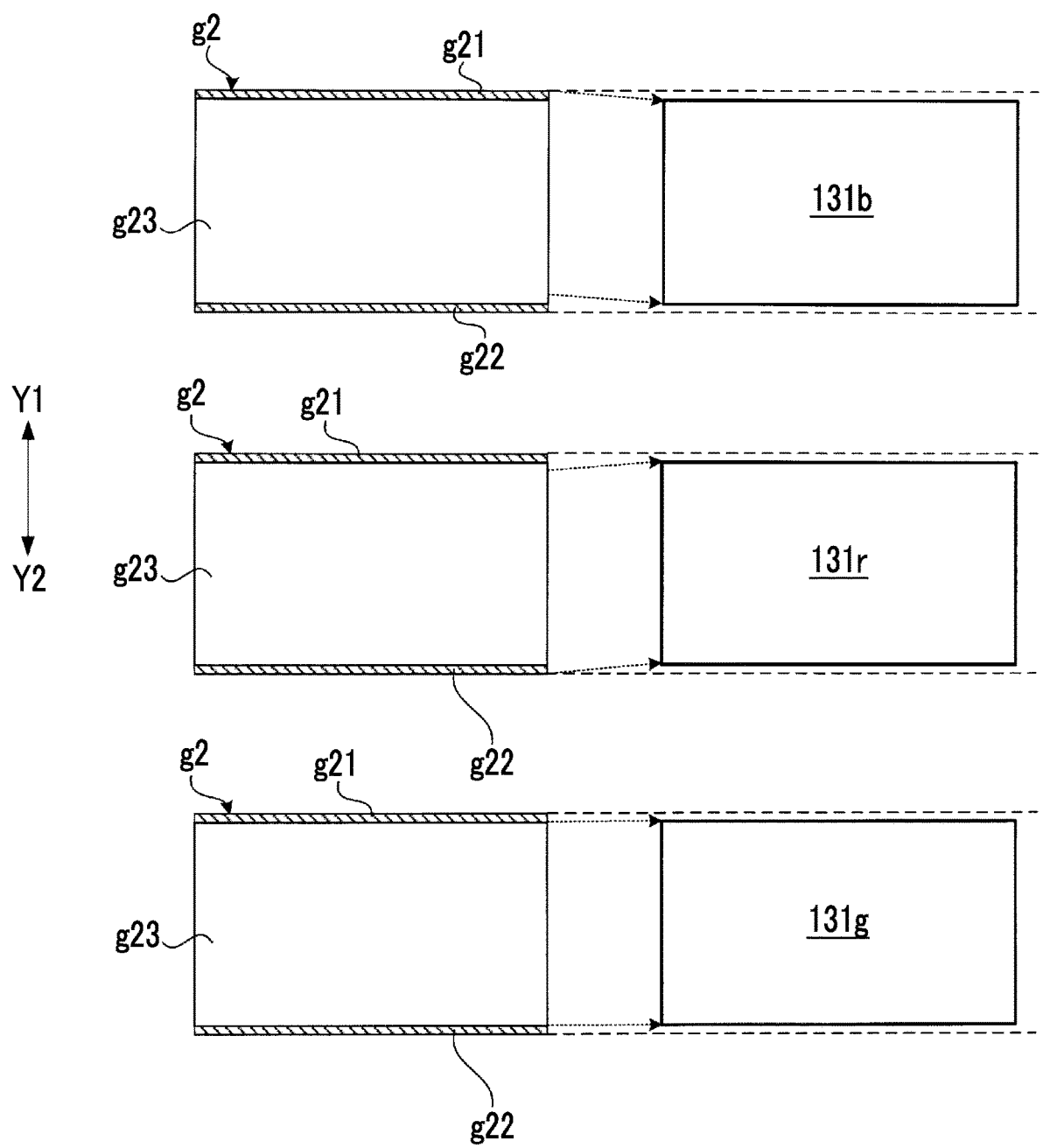
FIG. 9 is a schematic diagram for describing a state where a corrected image based on corrected image data g2 illustrated in FIG. 8 is projected to the screen SC.

FIG. 9 is a schematic diagram for describing a state where a corrected image based on the corrected image data g2 illustrated in FIG. 8 is projected to the screen SC. In the corrected image based on the corrected image data g2, the region g23 is projected to the predetermined position on the screen SC.

As illustrated in an upper part of FIG. 9, a B image 131b based on the B image data included in the corrected image data g2 is projected to the screen SC with a deviation corresponding to the B deviation amount Bp from the predetermined position in the direction Y2 due to the chromatic aberration of the projection optical system. Accordingly, a projection position of the B image 131b is corrected to the predetermined position.

As illustrated in a middle part of FIG. 9, an R image 131r based on the R image data included in the corrected image data g2 is projected to the screen SC with a deviation corresponding to the R deviation amount Rp from the predetermined position in the direction Y1 due to the chromatic aberration of the projection optical system. Accordingly, a projection position of the R image 131r is corrected to the predetermined position.

As illustrated in a lower part of FIG. 9, a G image 131g based on the G image data included in the corrected image data g2 is projected to the predetermined position. Accordingly, each of the B image 131b, the R image 131r, and the G image 131g is projected to the predetermined position. Thus, the corrected image projected to the screen SC does not include the R image region Gr and the B image region Gb and does not have a color deviation.

Accordingly, the system control portion 14 generates regions (the first margin region g11 and the second margin region g12) that are necessary for removing the R image region Gr and the B image region Gb and are used for shifting the R image data and the B image data, by the reduction processing and generates the corrected image data g2 by performing the image shifting processing of shifting the R image data in a direction opposite to a deviation direction of the R image based on the R image data and shifting the B image data in a direction opposite to a deviation direction of the B image based on the B image data using the regions.

By doing so, only a size of the projected corrected image is decreased compared to the image projected based on the input image data g1, and both of correction of the chromatic aberration and prevention of a loss in image can be established.

In order to perform the above processing, a set formed of information about a reduction direction and the reduction rate used in the reduction processing of the input image data, margin region information indicating coordinates of a margin region added to the reduced image data, and shifting information used in the image shifting processing is stored in the ROM of the system control portion 14 for each projection condition.

Figure 10:
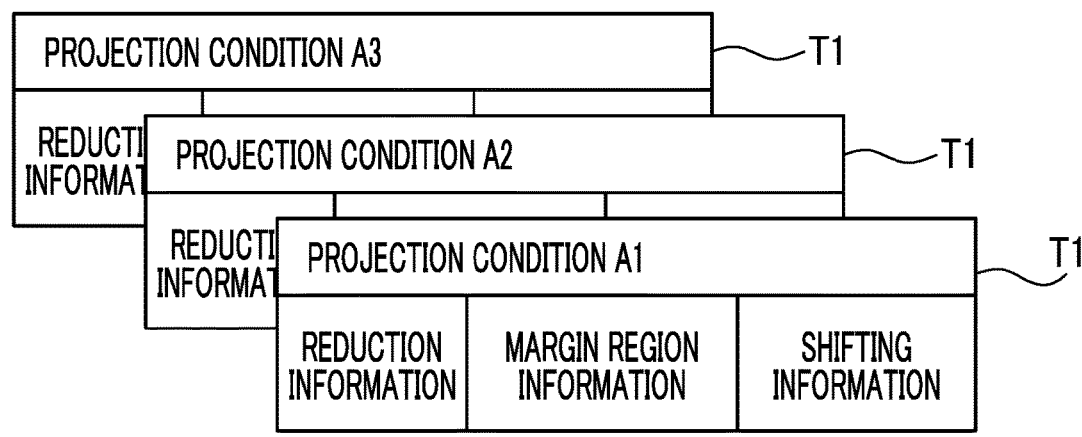
FIG. 10 is a schematic diagram illustrating an example of information stored in a ROM of the system control portion 14.

FIG. 10 is a schematic diagram illustrating an example of the information stored in the ROM of the system control portion 14. As illustrated in FIG. 10, the ROM of the system control portion 14 stores multiple correction tables T1. As described above, the correction tables T1 are data tables including the projection condition, reduction information, the margin region information, and the shifting information.

The reduction information is information about the reduction direction and the reduction rate.

The shifting information includes information about a shifting amount and a shifting direction of the R image data included in the reduced image data obtained by the reduction processing and information about a shifting amount and a shifting direction of the B image data included in the reduced image data obtained by the reduction processing.

The correction tables T1 are prepared and stored for each settable projection condition. In addition, the correction tables T1 for each projection condition illustrated in FIG. 10 are individually created and stored for each of a state where the shift position of the first member 2 is the shift position PU, and a state where the shift position of the first member 2 is the shift position PD. The correction tables T1 are generated at a time of manufacturing of the projector 100 and stored in the ROM.

FIG. 11 is a flowchart for describing an operation of the system control portion 14.

In a case where the input image data g1 is acquired (step S1), the system control portion 14 determines the shift position of the first member 2 that is set at the current point in time (step S2).

In a case where the shift position is the shift position PC illustrated in FIG. 6 (step S2: YES), the system control portion 14 projects the image based on the input image data g1 to the screen SC from the projection optical system by inputting the acquired input image data g1 into the light modulation unit 12 (step S10).

In other words, processing in step S10 is processing in which the reduction rate in the reduction processing is set to 100%, and the shifting amounts of the R image data and the B image data in the image shifting processing are set to zero.

In the configuration of the present embodiment, the chromatic aberration does not occur in a case where the shift position is the shift position PC. Thus, in a case where a YES determination is made in step S2, the correction processing is not performed on the input image data g1.

However, in a configuration in which the chromatic aberration occurs in the projected image even in a case where the shift position is the shift position PC, it is preferable that the correction processing is performed on the input image data g1 using a correction table corresponding to the shift position.

In a case where the shift position is the shift position PU or the shift position PD illustrated in FIG. 5 or FIG. 7 (step S2: NO), the system control portion 14 reads out the correction table T1 corresponding to the projection condition set at the current point in time and the shift position of the first member 2 from the ROM (step S3).

The system control portion 14 generates the reduced image data by reducing the input image data g1 in accordance with the reduction information included in the read correction table T1 (step S4).

Next, the system control portion 14 adds the first margin region and the second margin region to the generated reduced image data in accordance with the margin region information included in the read correction table T1 (step S5).

Next, the system control portion 14 generates the corrected image data g2 by shifting the R image data and the B image data of the generated reduced image data in accordance with the shifting information included in the read correction table T1 (step S6).

After step S6, the system control portion 14 projects the image based on the corrected image data g2 to the screen SC from the projection optical system by inputting the corrected image data g2 into the light modulation unit 12 (step S7).

In a case where new input image data g1 is input after processing in step S7 and step S10 (step S8: YES), the system control portion 14 restores processing to step S1.

In a case where the new input image data g1 is not input after processing in step S7 and step S10 (step S8: NO), the system control portion 14 determines whether or not the shift position of the first member 2 is changed (step S9).

In a case where the shift position is changed (step S9: YES), the system control portion 14 restores processing to step S2. In a case where the shift position is not changed (step S9: NO), the system control portion 14 restores processing to step S8.

According to the operation illustrated in FIG. 11, even in a case where the size of the input image data g1 is the same as the size of the display surface of the light modulation element 12a, the chromatic aberration of the image can be corrected by the reduction processing in step S4 and the image shifting processing in step S6 without a loss in image projected to the screen SC.

In FIG. 11, step S4 and step S6 constitute a correction step, and step S7 constitutes a projection control step.

First Modification Example of Projector of Embodiment

In a case of performing the reduction processing in step S4 in FIG. 11, the system control portion 14 may adjust the reduction rate based on the input image data g1. For example, the input image data g1 may have pixel values of RGB of zero, that is, a black image region, in both end parts in the direction Y due to a difference between an aspect ratio of contents included in the input image data g1 and an aspect ratio of the display surface of the light modulation element 12a.

In a case of the input image data g1 including the black image region, the system control portion 14 after step S3 refers to the margin region information included in the correction table T1 and determines whether or not a width of the first margin region in the direction Y is less than or equal to a width of the black image region in the end part of the input image data g1 on the direction Y1 side, and a width of the second margin region in the direction Y is less than or equal to a width of the black image region in the end part of the input image data g1 on the direction Y2 side.

In a case where a YES determination is made, the system control portion 14 corrects the reduction rate included in the correction table T1 to 100%. That is, the reduction processing in step S4 is omitted. In a case where a NO determination is made, the system control portion 14 performs processing in step S4 in accordance with the reduction rate included in the correction table T1.

In a case where step S4 is omitted, the system control portion 14 in step S6 generates the corrected image data g2 by shifting each of the R image data and the B image data included in the input image data g1 in accordance with the shifting information included in the correction table T1.

In this case, an end part of the R image data and an end part of the B image data in the input image data g1 are shifted outside the display surface and thus, are not displayed. However, these end parts are originally black image regions and thus, do not affect the projected image.

Accordingly, for the input image data g1 including the black image region originally for shifting the R image data and the B image data, a decrease in size of the corrected image can be prevented by setting the reduction rate to 100%, that is, not performing the reduction processing.

In this first modification example, for example, a case where the input image data g1 including the black image region having a width for which the reduction processing is not necessary, and the input image data g1 for which the reduction processing is necessary switch frequently is assumed.

For example, a case where the input image data acquired by the system control portion 14 changes in order of the input image data g1 including the black image region having the width for which the reduction processing is not necessary, the input image data g1 not including the black image region, the input image data g1 including the black image region having the width for which the reduction processing is not necessary, and the input image data g1 not including the black image region is assumed.

In this case, the reduction rate in step S4 changes in order of 100%, a value less than 100%, 100%, and the value less than 100%. In a case where information (for example, the number of times the reduction rate is increased and decreased in a predetermined period) indicating a change in reduction rate used in the reduction processing is greater than or equal to a first threshold value, it is preferable that the system control portion 14 maintains the reduction rate at the value less than 100%.

For example, after step S3, in a case where the reduction rate used in the reduction processing performed in the past is determined as changing such as 100%, 80%, 100%, and 80%, the system control portion 14 performs processing in step S4 in accordance with the correction table T1 read out in step S3 regardless of whether or not the black image region having the width for which the reduction processing is not necessary is included in the input image data g1. The reduction rate included in the correction table T1 is the value less than 100%.

Accordingly, in a case where an amount of change in reduction rate is large, a state where a size of the projected image is frequently increased and decreased repeatedly can be prevented by fixing the reduction rate to the value less than 100%.

Second Modification Example of Projector of Embodiment

In a case where the shift position illustrated in FIG. 5 is changed to the shift position illustrated in FIG. 6, or in a case where the shift position illustrated in FIG. 7 is changed to the shift position illustrated in FIG. 6, it is preferable that the system control portion 14 performs the reduction processing on the input image data g1 using the reduction rate of the correction table T1 read out in step S3 before the change in shift position, generates corrected image data g3 by adding a margin region to the reduced image data, which is obtained by the reduction processing, using the margin region information of the correction table T1, and projects an image based on the corrected image data g3 to the screen SC.

In the operation example in FIG. 11, for example, in a case where the shift position is changed from the shift position PU or the shift position PD to the shift position PC, processing in step S10 is performed. That is, the image based on the input image data g1 is projected by inputting the input image data g1 into the light modulation unit 12 without correcting the input image data g1.

In this modification example, in a case where the shift position is changed from the shift position PU or the shift position PD to the shift position PC, and a YES determination is made in step S2, the system control portion 14 performs the reduction processing on the input image data g1 using the correction table T1 that is read out in immediately previous step S3.

Furthermore, the system control portion 14 generates the corrected image data g3 by adding the first margin region and the second margin region to the reduced image data obtained by the reduction processing in accordance with the correction table T1. The system control portion 14 projects the image based on the corrected image data g3 to the screen SC.

According to this modification example, even in a case where the shift position is the shift position PU or the shift position PD, and the shift position is changed from a state where processing in step S3 to step S6 is performed to the shift position PC at which processing in step S3 to step S6 is not necessary, the corrected image data g3 is generated by performing the same processing as in step S4 and step S5.

The image based on the corrected image data g3 and the image based on the corrected image data g2 generated in step S6 have the same size. Thus, according to this modification example, a significant change in size of a projection image due to a change in shift position can be suppressed.

Third Modification Example of Projector of Embodiment

In this modification example, a system that displays one large screen using a plurality of the projectors 100 illustrated in FIG. 1 is assumed. The large screen is formed in a state where the image projected to the screen SC from each projector 100 partially overlaps.

In a case where the system control portion 14 of a specific projector 100 is connected to the system control portion 14 of another projector 100 other than the specific projector 100, the system control portion 14 of the specific projector 100 operates in a panoramic mode.

In the panoramic mode, the system control portion 14 acquires each of the input image data g1 for the specific projector 100 that is a base of the image to be projected from the specific projector 100, and the input image data g1 for the other projector 100 that is a base of the image to be projected from the other projector 100. In a case where the input image data g1 for the specific projector 100 is acquired, the system control portion 14 performs the correction processing on the input image data g1 in accordance with the operation illustrated in FIG. 11.

Using the correction table T1 used in the correction processing, the system control portion 14 performs the correction processing on the input image data g1 for the other projector 100 in the same manner and transmits the corrected image data g2 to the system control portion 14 of the other projector 100. Accordingly, the image based on the corrected image data g2 generated with the same correction table T1 is projected to the screen SC from each projector 100.

According to this modification example, in a case of performing large screen projection from the plurality of projectors 100 by causing the images to partially overlap, a deviation in size of each image can be suppressed. Accordingly, quality of the images in a case of large screen projection can be increased.

Fourth Modification Example of Projector of Embodiment

The projector 100 illustrated in FIG. 1 is described as being used in an installation state where the direction Y2 illustrated in FIG. 3 is the vertical direction. However, for example, the projector 100 may be used in an installation state where the direction Y1 is the vertical direction by installing the projector 100 on a ceiling.

In the installation state where the direction Y1 is the vertical direction, the image displayed on the display surface of the display portion needs to be inverted upside down with respect to the installation state in FIG. 3. Meanwhile, the widths and positions of the R image region Gr and the B image region Gb illustrated in FIG. 5 and FIG. 7 are decided by the shift position or the projection condition and do not change depending on the installation state of the projector 100.

Therefore, the system control portion 14 first determines whether the installation state is a first installation state where the direction Y2 is the vertical direction, or a second installation state where the direction Y1 is the vertical direction, based on information of an acceleration sensor or the like disposed in the projector 100.

In a case of the first installation state, the system control portion 14 performs the correction processing on the input image data g1 in accordance with the above content.

In a case of the second installation state, the system control portion 14 inverts the acquired input image data g1 upside down and then, performs the correction processing on the input image data g1 in accordance with the above content.

Accordingly, in a case of the second installation state, instead of performing the correction processing on the input image data g1 in accordance with the above content and then projecting the image by inverting the corrected image data g2 obtained by the correction processing upside down, by inverting the input image data g1 upside down and then performing the correction processing on the input image data g1 and projecting the image based on the corrected image data g2 obtained by the correction processing, the chromatic aberration of the projected image can be eliminated even in a case where the installation state changes.

Fifth Modification Example of Projector of Embodiment

The system control portion 14 may be able to selectively execute a correction mode in which processing (processing including the correction processing of the input image data g1) illustrated in FIG. 11 is performed, and a non-correction mode in which processing illustrated in FIG. 11 is not performed. In the non-correction mode, after step S1 illustrated in FIG. 11, processing in which processing in step S10 is performed is repeated.

For example, in a case where a switching instruction input from an operating part, not illustrated, disposed in the projector 100 is received, the system control portion 14 switches between the correction mode and the non-correction mode.

The system control portion 14 may determine a content of the input image data g1 and execute the correction mode in a case where the input image data g1 is a still picture, and execute the non-correction mode in a case where the input image data g1 is a motion picture.

In a case of the still picture, the chromatic aberration is likely to stand out. Thus, by executing the correction mode only in a case of the still picture, quality of the projection image can be increased. In addition, by executing the non-correction mode at a time of the motion picture, a processing load can be reduced.

Sixth Modification Example of Projector of Embodiment

In the description thus far, the correction tables T1 illustrated in FIG. 10 are stored in advance in the ROM of the system control portion 14. However, in a case where the optical unit 6 is interchangeable, and the optical characteristic of the optical unit 6 is not known, the correction tables T1 cannot be used for correction.

Therefore, in a case where the optical unit 6 with which the correction table T1 is not stored in association is mounted, the system control portion 14 projects a test image based on test image data (for example, data for displaying a white image) to the screen SC by inputting the test image data into the light modulation unit 12.

In a state where the test image is projected, the system control portion 14 captures the test image using the imaging element 38 and acquires captured image data obtained by imaging. The system control portion 14 detects the widths and positions of the R image region Gr and the B image region Gb described using FIG. 5 and FIG. 7 based on the captured image data. The correction tables T1 are generated based on the widths and the positions and stored in the ROM.

By generating the correction tables T1 based on the captured image data, the system control portion 14 can correct the chromatic aberration of the projected image even in a case where the optical unit 6 having an unknown optical characteristic is mounted.

Seventh Modification Example of Projector of Embodiment

As described above, in a case of a configuration in which the image G1 can be shifted in the right-left direction, the reduction information included in the correction tables T1 includes any of the direction Z and the direction Y as the information about the reduction direction. In addition, in a case of a configuration in which the image G1 can be shifted in an up-down direction and the right-left direction, the reduction information includes a reduction rate Shy in the direction Y and a reduction rate SHz in the direction Z.

Accordingly, in a case where the reduction rate needs to be decided in each of the direction Y and the direction Z, it is desirable that the reduction rate in one direction matches the reduction rate in the other direction so that the reduced image data and the input image data g1 have a matching aspect ratio.

Specifically, in a case where the reduction rate in each of the direction Y and the direction Z is different, a smaller value of the two reduction rates is registered in the correction tables T1 as the reduction rate in each of the direction Y and the direction Z. Accordingly, a change in aspect ratio of the projected image before and after the correction processing can be prevented.

In the embodiment and the modification examples described thus far, the chromatic aberration is corrected by shifting image data of a specific color of the reduced image data by a uniform amount. However, depending on the characteristic of the projection optical system, the chromatic aberration may not be completely eliminated by shifting the image data. Thus, in a case where the chromatic aberration that cannot be corrected is present in the corrected image data obtained by performing the reduction processing and the image shifting processing, it is preferable that another processing for correcting the chromatic aberration is additionally performed. By doing so, the chromatic aberration of the projection image can be further reduced.

The embodiment and the modification examples described thus far can be appropriately combined without contradiction.

In the projector 100 illustrated in FIG. 1, the imaging portion is configured to image the screen SC through a part of the projection optical system. Instead, the imaging portion may be disposed separately from the optical unit 6.

In addition, the configuration of the optical unit 6 of the projector 100 is an example and is not limited to the illustration in FIG. 3. For example, the image from the display portion may be configured to be directly incident on the second optical system 31. In addition, the shift mechanism 5 is not essential and can be omitted.

As described thus far, the following matters are disclosed in the present specification.

(1)

A control device of a projection apparatus that projects an image from a display portion displaying the image to a projection object through an optical system, the control device comprising a correction portion that generates corrected image data by performing correction processing including reduction processing of reducing input image data input into the display portion at a first reduction rate and image shifting processing of shifting a position of color image data of a specific color component included in reduced image data obtained by the reduction processing, and a projection control portion that projects a corrected image based on the corrected image data to the projection object by inputting the corrected image data generated by the correction portion into the display portion.

(2)

The control device according to (1), in which the correction portion controls the first reduction rate.

(3)

The control device according to (2), in which the correction portion controls the first reduction rate based on the input image data.

(4)

The control device according to (3), in which in a case where a region in which a pixel value is zero is present in an end part of the input image data, the correction portion controls the first reduction rate based on a size of the region.

(5)

The control device according to (4), in which in performing the correction processing on a plurality of pieces of the input image data in a time-series manner, in a case where an amount of change in the first reduction rate is greater than or equal to a first threshold value, the correction portion sets the first reduction rate to a value less than 100%.

(6)

The control device according to any one of (1) to (5), in which the correction portion controls the first reduction rate based on a projection condition of the image.

(7)

The control device according to (6), in which the projection condition includes at least one of a focal length of the optical system, a focal position of the optical system, or a distance between the optical system and the projection object.

(8)

The control device according to any one of (1) to (7), in which in the reduction processing, the correction portion reduces a size of the input image data in at least one of a vertical direction or a horizontal direction.

(9)

The control device according to (8), in which in a case of reducing the size of the input image data in each of the vertical direction and the horizontal direction in the reduction processing, the correction portion matches a reduction rate of the size in the vertical direction with a reduction rate of the size in the horizontal direction.

(10)

The control device according to any one of (1) to (9), in which the projection apparatus has a mode in which a plurality of the images are projected to the projection object in a partially overlapping state in cooperation with another projection apparatus, and in the mode, the correction portion executes the correction processing on the input image data input into the display portion of the other projection apparatus using the first reduction rate decided in the projection apparatus.

(11)

The control device according to any one of (1) to (10), in which the projection apparatus is capable of projecting the image in a state where a display surface of the display portion is shifted in one direction with respect to an optical axis of the optical system, and the correction portion performs the correction processing after rotating the input image data based on an attitude of the projection apparatus.

(12)

The control device according to any one of (1) to (11), in which the projection apparatus includes a shift mechanism that changes a relative position in one direction between a display surface of the display portion and an optical axis of the optical system, and the correction portion controls the first reduction rate based on the relative position.

(13)

The control device according to (12), in which in a case where the relative position is changed from a relative position at which the first reduction rate is less than or equal to a second threshold value to a relative position at which the first reduction rate exceeds the second threshold value, the correction portion generates the corrected image data by reducing the input image data in a state where the first reduction rate is maintained, and setting a shifting amount of the color image data in the image shifting processing to zero, and inputs the corrected image data into the display portion.

(14)

The control device according to any one of (1) to (13), in which the projection apparatus includes an imaging portion that images the projection object, and the correction portion decides the first reduction rate and a shifting amount of the color image data based on captured image data, acquired from the imaging portion, of the image projected to the projection object.

(15)

The control device according to any one of (1) to (14), in which a correction mode in which the correction processing is executed, and a non-correction mode in which the correction processing is not executed are selectively executed.

(16)

The control device according to (15), in which the correction mode and the non-correction mode are switched based on an input instruction.

(17)

The control device according to (15), in which the correction mode and the non-correction mode are switched based on a content of the input image data.

(18)

A projection apparatus comprising the control device according to any one of (1) to (17), and the optical system.

(19)

A control method of a projection apparatus that projects an image from a display portion displaying the image to a projection object through an optical system, the control method comprising a correction step of generating corrected image data by performing correction processing including reduction processing of reducing input image data input into the display portion at a first reduction rate and image shifting processing of shifting a position of color image data of a specific color component included in reduced image data obtained by the reduction processing, and a projection control step of projecting a corrected image based on the corrected image data to the projection object by inputting the corrected image data generated in the correction step into the display portion.

(20)

The control method according to (19), in which in the correction step, the first reduction rate is controlled.

(21)

The control method according to (20), in which in the correction step, the first reduction rate is controlled based on the input image data.

(22)

The control method according to (21), in which in the correction step, in a case where a region in which a pixel value is zero is present in an end part of the input image data, the first reduction rate is controlled based on a size of the region.

(23)

The control method according to (22), in which in the correction step, in performing the correction processing on a plurality of pieces of the input image data in a time-series manner, in a case where an amount of change in the first reduction rate is greater than or equal to a first threshold value, the first reduction rate is set to a value less than 100%.

(24)

The control method according to any one of (19) to (23), in which in the correction step, the first reduction rate is controlled based on a projection condition of the image.

(25)

The control method according to (24), in which the projection condition includes at least one of a focal length of the optical system, a focal position of the optical system, or a distance between the optical system and the projection object.

(26)

The control method according to any one of (19) to (25), in which in the correction step, in the reduction processing, a size of the input image data in at least one of a vertical direction or a horizontal direction is reduced.

(27)

The control method according to (26), in which in the correction step, in a case of reducing the size of the input image data in each of the vertical direction and the horizontal direction in the reduction processing, a reduction rate of the size in the vertical direction is matched with a reduction rate of the size in the horizontal direction.

(28)

The control method according to any one of (19) to (27), in which the projection apparatus has a mode in which a plurality of the images are projected to the projection object in a partially overlapping state in cooperation with another projection apparatus, and in the correction step, in the mode, the correction processing on the input image data input into the display portion of the other projection apparatus is executed using the first reduction rate decided for the input image data input into the display portion of one projection apparatus.

(29)

The control method according to any one of (19) to (28), in which the projection apparatus is capable of projecting the image in a state where a display surface of the display portion is shifted in one direction with respect to an optical axis of the optical system, and in the correction step, the correction processing is performed after the input image data is rotated based on an attitude of the projection apparatus.

(30)

The control method according to any one of (19) to (29), in which the projection apparatus includes a shift mechanism that changes a relative position in one direction between a display surface of the display portion and an optical axis of the optical system, and in the correction step, the first reduction rate is controlled based on the relative position.

(31)

The control method according to (30), in which in the correction step, in a case where the relative position is changed from a relative position at which the first reduction rate is less than or equal to a second threshold value to a relative position at which the first reduction rate exceeds the second threshold value, the corrected image data is generated by reducing the input image data in a state where the first reduction rate is maintained, and setting a shifting amount of the color image data in the image shifting processing to zero, and the corrected image data is input into the display portion.

(32)

The control method according to any one of (19) to (31), in which the projection apparatus includes an imaging portion that images the projection object, and in the correction step, the first reduction rate and a shifting amount of the color image data are decided based on captured image data, acquired from the imaging portion, of the image projected to the projection object.

(33)

The control method according to any one of (19) to (32), in which a correction mode in which the correction processing is executed, and a non-correction mode in which the correction processing is not executed are selectively executed.

(34)

The control method according to (33), in which the correction mode and the non-correction mode are switched based on an input instruction.

(35)

The control method according to (33), in which the correction mode and the non-correction mode are switched based on a content of the input image data.

(36)

A control program of a projection apparatus that projects an image from a display portion displaying the image to a projection object through an optical system, the control program causing a computer to execute a correction step of generating corrected image data by performing correction processing including reduction processing of reducing input image data input into the display portion at a first reduction rate and image shifting processing of shifting a position of color image data of a specific color component included in reduced image data obtained by the reduction processing, and a projection control step of projecting a corrected image based on the corrected image data to the projection object by inputting the corrected image data generated in the correction step into the display portion.

While various embodiments are described above with reference to the drawings, the present invention is not limited to such examples. It is apparent that those skilled in the art may perceive various modification examples or correction examples within a scope disclosed in the claims, and those examples are also understood as falling in a technical scope of the present invention. In addition, any combination of various constituents in the embodiment may be used without departing from a gist of the invention.

The present application is based on Japanese Patent Application (JP2019-158888) filed on Aug. 30, 2019, the content of which is incorporated in the present application by reference.

Explanation of References

100: projector
1: body part
2: first member
2a, 2b: opening
2A: hollow portion
21: first optical system
22: reflective member
3: second member
3a, 3c: opening
3A: hollow portion
31: second optical system
32: branch member
33: third optical system
34: lens
37: fourth optical system
38: imaging element
39: image processing portion
5: shift mechanism
6: optical unit
11: light source unit
41: light source
42: color wheel
43: illumination optical system
12: light modulation unit
12a: light modulation element
12b: light modulation element driving portion
14: system control portion
15: housing
15a: opening
K: optical axis
SC: screen
CI: image circle
G1: image
G1a: image region
Gr: R image region
Gb: B image region
g1: input image data
g11: first margin region
g12: second margin region
131R: R image data
131r: R image
131G: G image data
131g: G image
131B: B image data
131b: B image
g21, g22, g23: region
g2, g3: corrected image data
T1: correction table

What is claimed is:

1. A control device of a projection apparatus that projects an image from a display portion displaying the image to a projection object through an optical system, the control device comprising:
a processor configured to
generate corrected image data by performing correction processing including reduction processing of reducing input image data input into the display portion at a first reduction rate and image shifting processing of shifting a position of color image data of a specific color component included in reduced image data obtained by the reduction processing by a specific amount in a specific direction, the specific amount and the specific direction being predetermined according to the specific color; and
project a corrected image based on the corrected image data to the projection object by inputting the corrected image data generated by the processor into the display portion,
wherein when a region in which a pixel value is zero is present in an end part of the input image data, the processor controls the first reduction rate based on a size of the region.

2. The control device according to claim 1,
wherein in performing the correction processing on a plurality of pieces of the input image data in a time-series manner, when an amount of change in the first reduction rate is greater than or equal to a first threshold value, the processor sets the first reduction rate to a value less than 100%.

3. A control method of a projection apparatus that projects an image from a display portion displaying the image to a projection object through an optical system, the control method comprising:
a correction step of generating corrected image data by performing correction processing including reduction processing of reducing input image data input into the display portion at a first reduction rate and image shifting processing of shifting a position of color image data of a specific color component included in reduced image data obtained by the reduction processing by a specific amount in a specific direction, the specific amount and the specific direction being predetermined according to the specific color; and
a projection control step of projecting a corrected image based on the corrected image data to the projection object by inputting the corrected image data generated in the correction step into the display portion,
wherein in the correction step, when a region in which a pixel value is zero is present in an end part of the input image data, the first reduction rate is controlled based on a size of the region.

4. The control method according to claim 3,
wherein in the correction step, in performing the correction processing on a plurality of pieces of the input image data in a time-series manner, when an amount of change in the first reduction rate is greater than or equal to a first threshold value, the first reduction rate is set to a value less than 100%.

5. A non-transitory computer readable medium storing a control program of a projection apparatus that projects an image from a display portion displaying the image to a projection object through an optical system, the control program causing a computer to execute:
a correction step of generating corrected image data by performing correction processing including reduction processing of reducing input image data input into the display portion at a first reduction rate and image shifting processing of shifting a position of color image data of a specific color component included in reduced image data obtained by the reduction processing by a specific amount in a specific direction, the specific amount and the specific direction being predetermined according to the specific color; and a projection control step of projecting a corrected image based on the corrected image data to the projection object by inputting the corrected image data generated in the correction step into the display portion, wherein in the correction step, when a region in which a pixel value is zero is present in an end part of the input image data, the first reduction rate is controlled based on a size of the region.

* * * * *